US008885133B2

(12) United States Patent
Oohira

(10) Patent No.: US 8,885,133 B2
(45) Date of Patent: Nov. 11, 2014

(54) DISPLAY DEVICE

(71) Applicant: Japan Display East Inc., Mobara (JP)

(72) Inventor: Eiji Oohira, Mobara (JP)

(73) Assignee: Japan Display Inc., Tokyo (JP)

( * ) Notice: Subject to any disclaimer, the term of this patent is extended or adjusted under 35 U.S.C. 154(b) by 107 days.

(21) Appl. No.: 13/767,996

(22) Filed: Feb. 15, 2013

(65) Prior Publication Data
US 2013/0222718 A1 Aug. 29, 2013

(30) Foreign Application Priority Data

Feb. 24, 2012 (JP) .................................. 2012-038513

(51) Int. Cl.
*G02F 1/1337* (2006.01)
*H04N 13/04* (2006.01)

(52) U.S. Cl.
CPC ....... *H04N 13/0409* (2013.01); *H04N 13/0411* (2013.01)

USPC ........... 349/150; 349/149; 349/151; 349/152; 349/158

(58) Field of Classification Search
USPC ......................................... 349/149–152, 158
See application file for complete search history.

(56) References Cited

FOREIGN PATENT DOCUMENTS

JP 2004-294862 10/2004

*Primary Examiner* — Phu Vu
(74) *Attorney, Agent, or Firm* — Antonelli, Terry, Stout & Kraus, LLP.

(57) ABSTRACT

A display device includes a display panel, a liquid crystal panel superimposed on the display panel for enabling naked-eye stereoscopic view by separating a left-eye image and a right-eye image displayed on the display panel, and a flexible wiring substrate attached to the liquid crystal panel. The liquid crystal panel has a substrate and a substrate opposed to each other. The substrate has a projection part that projects from the substrate. The flexible wiring substrate is attached to a surface of the projection part of the substrate at the substrate side. The substrate is formed to be thinner than the substrate and provided at a side of the display panel.

5 Claims, 4 Drawing Sheets

DISPLAY DEVICE

CROSS-REFERENCE TO RELATED APPLICATION

The present application claims priority from Japanese application JP2012-038513 filed on Feb. 24, 2012, the content of which is hereby incorporated by reference into this application.

BACKGROUND OF THE INVENTION

1. Field of the Invention

This invention relates to a display device.

2. Description of the Related Art

Recently, products meeting the requirement of stereoscopic display of images have been developed, and liquid crystal display devices having parallax barrier liquid crystal panels for naked-eye view have been known as small and medium equipment such as cellular phones and portable information terminals (JP 2004-294862 A). The parallax barrier liquid crystal panel is superimposed on a liquid crystal display panel.

Since a flexible wiring substrate is attached to the parallax barrier liquid crystal panel for electrical connection, one of the substrates sandwiching liquid crystal is projected. Thinner parallax barrier liquid crystal panels have been required and the substrates have been made thinner, and there has been a problem that the substrate to which the flexible wiring substrate is attached is easily broken because of its thinness.

SUMMARY OF THE INVENTION

An object of the invention is to prevent breakage of a substrate of a liquid crystal panel that enables stereoscopic view.

(1) A display device according to the invention includes a display panel, a liquid crystal panel for enabling stereoscopic view by separating a left-eye image and a right-eye image, and a flexible wiring substrate attached to the liquid crystal panel, wherein the liquid crystal panel has a first substrate and a second substrate opposed to each other, the first substrate has a projection part that projects further beyond the second substrate, the flexible wiring substrate is attached to a surface of the projection part of the first substrate at the second substrate side, the liquid crystal panel is superimposed on the display pane, and the second substrate is formed to be thinner than the first substrate and provided at a side of the display panel. According to the invention, the thinner second substrate of the liquid crystal panel is provided at the side of the display panel, and thus, the distance from an image formation area of the display panel to a region for separating the left-eye image and the right-eye image may be made smaller. Further, the first substrate having the projection part for attachment of the flexible wiring substrate is thicker than the second substrate and harder to be broken.

(2) In the display device according to (1), the display panel has a third substrate and a fourth substrate opposed to each other, the third substrate has a projection part that projects further beyond the fourth substrate, another flexible wiring substrate is attached to a surface of the projection part of the third substrate at the fourth substrate side, and the third substrate is provided at an opposite side to the liquid crystal panel.

(3) In the display device according to (2), the display panel and the liquid crystal panel are provided so that the projection part of the first substrate and the projection part of the third substrate may project in the same direction.

(4) In the display device according to (2), the display panel and the liquid crystal panel are provided so that the projection part of the first substrate and the projection part of the third substrate may project in opposite directions to each other.

(5) The display device according to (4) further includes a housing that houses the display panel and the liquid crystal panel, and a spacer provided between the surface of the projection part of the third substrate at the fourth substrate side and the housing.

DETAILED DESCRIPTION OF THE INVENTION

As below, embodiments of the invention will be explained with reference to the drawings.

First Embodiment

Figure 1:
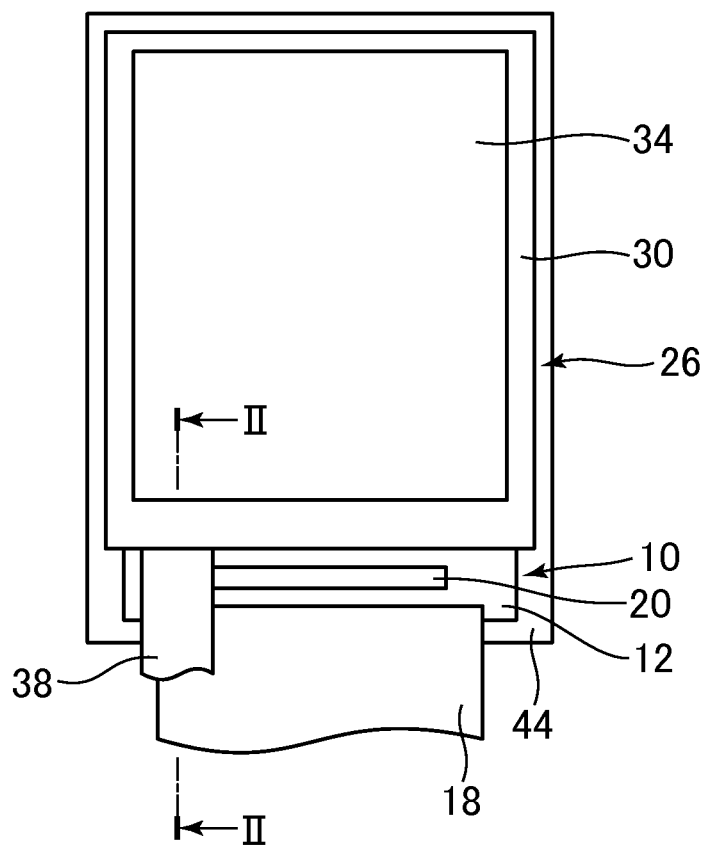
FIG. 1 is a plan view showing a display device according to the first embodiment of the invention.
Figure 2:
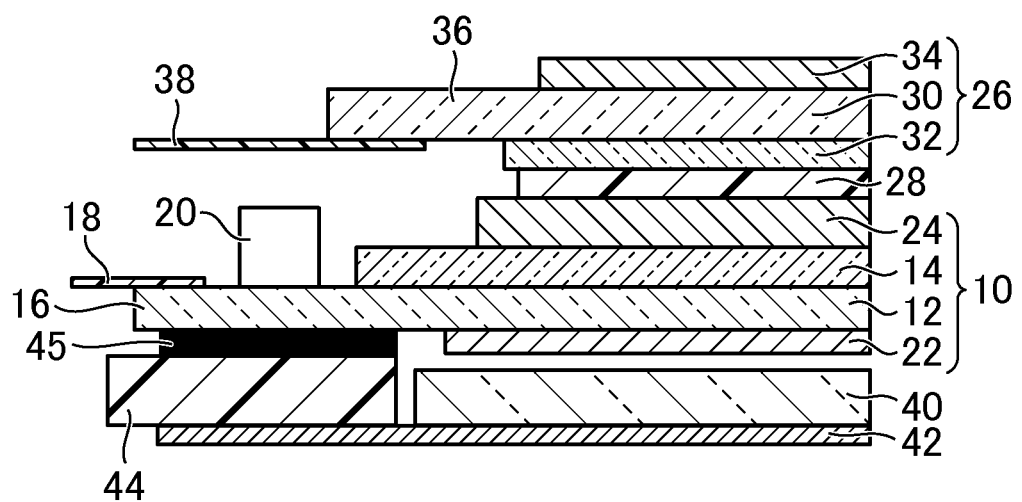
FIG. 2 is a sectional view along II-II line of the display device shown in FIG. 1.

FIG. 1 is a plan view showing a display device according to an embodiment of the invention. FIG. 2 is a sectional view along II-II line of the display device shown in FIG. 1.

The display device has a display panel 10. The display panel 10 has a substrate 12 and a substrate 14 opposed to each other. The substrate 12 and the substrate 14 are formed using a transparent material such as glass. In the embodiment, the display panel 10 is a liquid crystal display panel, and liquid crystal (not shown) intervenes between the substrate 12 and the substrate 14. Any system such as the IPS (In Plane Switching) system, the TN (Twisted Nematic) system, or the VA (Vertical Alignment) system may be employed as the driving method of liquid crystal, and electrodes and wires are formed according to the system. Alternatively, the display panel 10 may be an organic EL (Electro Luminescence) panel.

The substrate 12 is a TFT (Thin Film Transistor) substrate. On the surface of the substrate 12 facing the substrate 14, a thin-film transistor, wires, and electrodes (not shown) are formed. The substrate 14 is a color filter substrate, and a color filter (not shown) is formed thereon.

The substrate 12 has a projection part 16 projecting further beyond the substrate 14 when the panel is seen from the top surface. The wire (not shown) of the substrate 12 reaches the projection part 16. A flexible wiring substrate 18 is attached to the surface of the projection part 16 of the substrate 12 at the substrate 14 side. On the projection part 16 of the substrate 12, an integrated circuit chip 20 containing a driver circuit for driving liquid crystal is mounted. Polarizers 22, 24 are bonded to the substrate 12 and the substrate 14, respectively.

The display device according to the embodiment enables stereoscopic image display. Specifically, different two-dimensional images are recognized by the right and left eyes of a human, and the brain of the human constructs a three-dimensional space based on the two two-dimensional images. Accordingly, on the display panel 10, a left-eye image and a right-eye image are displayed.

The display device has a liquid crystal panel 26 superimposed on the display panel 10. The display panel 10 and the liquid crystal panel 26 are fixed by an adhesion layer 28 (or a bonding layer). The liquid crystal panel 26 is superimposed on the substrate 14 side of the display panel 10. Therefore, the substrate 12 of the display panel 10 is provided at the opposite side to the liquid crystal panel 26.

The liquid crystal panel 26 is a parallax barrier liquid crystal panel for enabling naked-eye stereoscopic view by separating the left-eye image and the right-eye image displayed on the display panel 10 according to the parallax barrier system. The parallax barrier system is a system of superimposing a vertical-striped filter (parallax barrier) on the image display surface so that the left eye may see only the left-eye image and the right eye may see only the right-eye image.

Alternatively, the liquid crystal panel 26 may be a lenticular lens liquid crystal panel for enabling naked-eye stereoscopic view by separating the left-eye image and the right-eye image displayed on the display panel 10 according to the lenticular lens system. The lenticular lens liquid crystal panel is a panel that forms a lenticular lens using liquid crystal, and disclosed in WO 2007/072289, for example. Note that formation of a microlens using liquid crystal is disclosed in JP 10-239676 A and JP 2009-48078 A.

The liquid crystal panel 26 has a substrate 30 and a substrate 32 opposed to each other. The substrate 30 and the substrate 32 are formed using a transparent material such as glass. Liquid crystal (not shown) is sandwiched between the substrate 30 and the substrate 32. On the surface of the substrate 30 facing the substrate 32, wires and electrodes (not shown) are formed. A polarizer 34 is bonded to the substrate 30 located at the opposite side to the display panel 10. As described above, the polarizer 24 is provided at the lower side of the substrate 32 (at the upper side of the substrate 14).

The substrate 32 is formed to be thinner than the substrate 30 and provided to the side of the display panel 10. The substrate 30 has a projection part 36 projecting further beyond the substrate 32 when the panel is seen from the top surface. The wire (not shown) of the substrate 30 reaches the projection part 36. A flexible wiring substrate 38 is attached to the surface of the projection part 36 of the substrate 30 at the substrate 32 side.

The display panel 10 and the liquid crystal panel 26 are provided so that the projection part 36 of the substrate 30 and the projection part 16 of the substrate 12 may project in the same direction. As shown in FIG. 2, of the substrates 12, 14, 30, 32, the end of the projection part 16 of the substrate 12 projects to the most anterior point. The end part of the projection part 36 of the substrate 30 projects to the more anterior point than the substrate 14 and overlaps with the projection part 16 of the substrate 12. The end part of the substrate 14 overlaps with the projection part 36 of the substrate 30. The projection part 16 of the substrate 12 and the substrate 32 do not face each other.

According to the embodiment, the thinner substrate 32 of the liquid crystal panel 26 is provided at the side of the display panel 10, and thus, the distance from an image formation area (a liquid crystal layer (not shown)) of the display panel 10 to a region for separating the left-eye image and the right-eye image (a liquid crystal layer (not shown)) may be made smaller. Further, the substrate 30 having the projection part 36 for attachment of the flexible wiring substrate 38 is thicker than the substrate 32 and harder to be broken.

A light guide plate 40 is provided to overlap with the display panel 10. The light guide plate 40 converts light entering from a point light source (not shown) into light of a surface light source. A reflection film 42 is provided at the opposite side of the light guide plate 40 to the display panel 10, and reflects light output downward from the light guide plate 40 (toward the opposite side to the display panel 10) and returns it to the light guide plate 40. A light source and an optical film (not shown) are added to the light guide plate 40 and the reflection film 42, and thereby, a backlight is formed. The display panel 10 is supported by a frame 44 formed by mold forming of resin. The display panel 10 and the frame 44 are fixed by a double-sided adhesive tape 45. The double-sided adhesive tape 45 has a light blocking function, and blocks light from the backlight.

Second Embodiment

Figure 3:
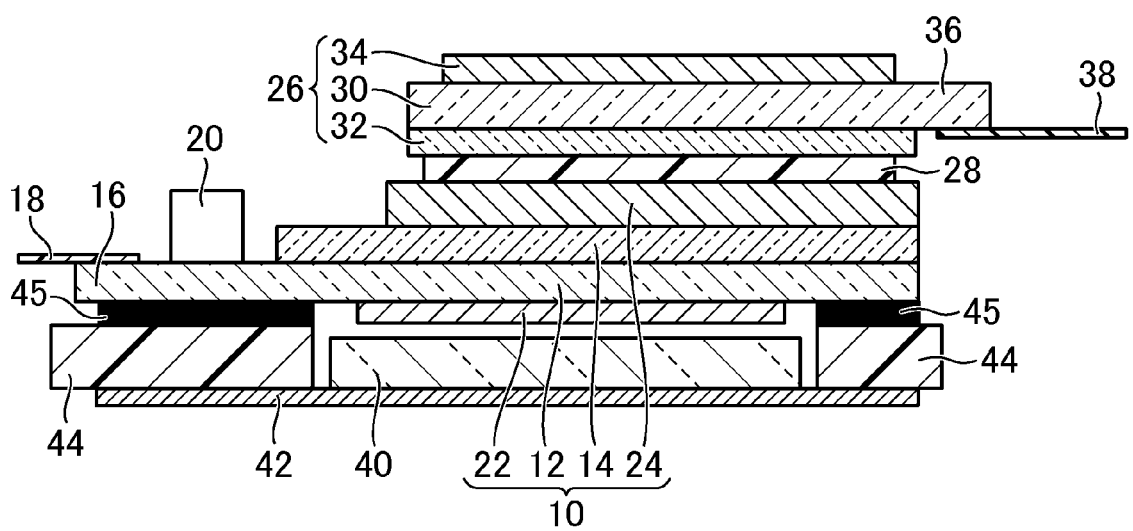
FIG. 3 is a sectional view showing a display device according to the second embodiment of the invention.

FIG. 3 is a sectional view showing a display device according to the second embodiment of the invention.

In the embodiment, the display panel 10 and the liquid crystal panel 26 are provided so that the projection part 36 of the substrate 30 and the projection part 16 of the substrate 12 may project in opposite directions to each other. According to the embodiment, there is no obstacle above the projection part 16 of the substrate 12 and there is no obstacle below the projection part 36 of the substrate 30. The rest of the structure corresponds to that explained in the first embodiment.

Third Embodiment

Figure 4:
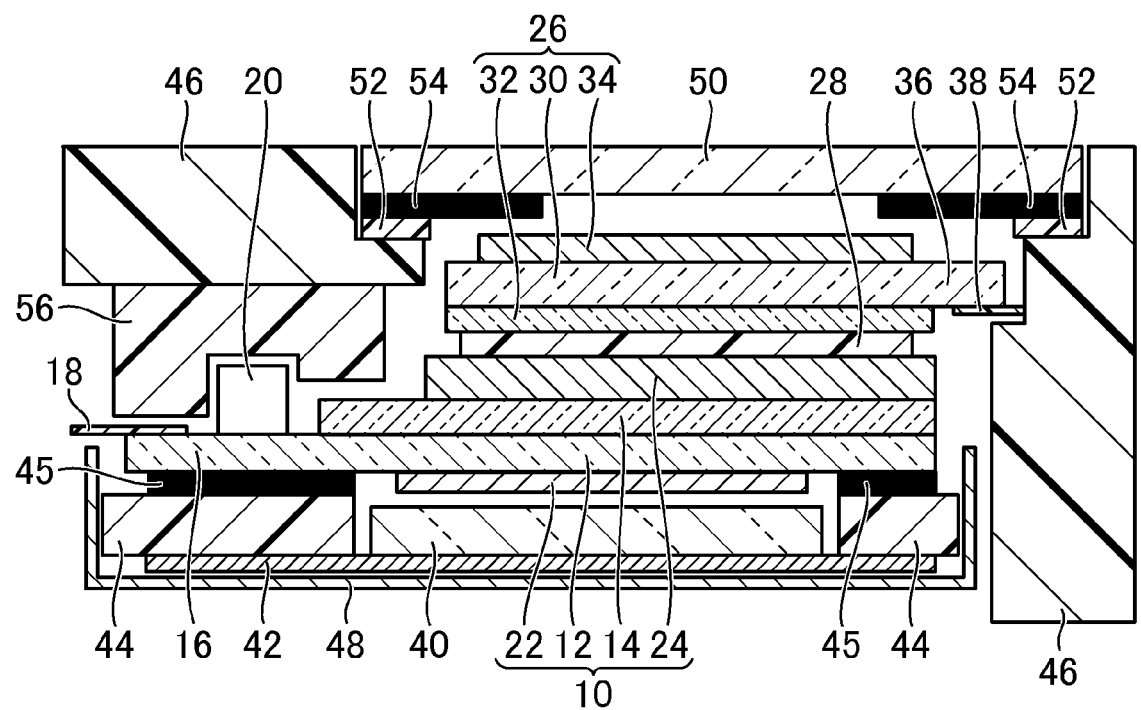
FIG. 4 is a sectional view showing a display device according to the third embodiment of the invention.

FIG. 4 is a sectional view showing a display device according to the third embodiment of the invention.

In the embodiment, the display panel 10 and the liquid crystal panel 26 are provided so that the projection part 36 of the substrate 30 and the projection part 16 of the substrate 12 may project in opposite directions to each other.

Further, the display device has a housing 46 that houses the display panel 10 and the liquid crystal panel 26. The housing 46 has a part provided around the display panel 10 and the liquid crystal panel 26. The housing 46 includes a lower frame 48 provided at the outer side (lower side) of the frame 44. A cover substrate 50 is provided to face the liquid crystal panel 26, and the cover substrate 50 is held by the housing 46 using a double-sided adhesive tape 52. Note that the cover substrate 50 is formed using a light-transmissive (e.g., transparent) material such as glass, and a light-blocking layer 54 formed by printing is provided in a frame shape. The light-blocking layer 54 faces toward the inside (the liquid crystal panel 26 side).

A part of the housing 46 is located at the side of the liquid crystal panel 26 and above the projection part 16 of the substrate 12 with a gap. A spacer 56 is provided between the upper surface of the projection part 16 of the substrate 12 (the surface at the substrate 14 side) and the housing 46. By holding the projection part 16 of the substrate 12 with the spacer 56, cracking may be prevented.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device comprising:
a display panel;
a liquid crystal panel for enabling stereoscopic view by separating a left-eye image and a right-eye image; and
a flexible wiring substrate attached to the liquid crystal panel, wherein the liquid crystal panel has a first substrate and a second substrate opposed to each other, the first substrate has a projection part that projects further beyond the second substrate, the flexible wiring substrate is attached to a surface of the projection part of the first substrate at the second substrate side, the liquid crystal panel is superimposed on the display pane, and the second substrate is formed to be thinner than the first substrate and provided at a side of the display panel.

2. The display device according to claim 1, wherein the display panel has a third substrate and a fourth substrate opposed to each other, the third substrate has a projection part that projects further beyond the fourth substrate, another flexible wiring substrate is attached to a surface of the projection part of the third substrate at the fourth substrate side, and the third substrate is provided at an opposite side to the liquid crystal panel.

3. The display device according to claim 2, wherein the display panel and the liquid crystal panel are provided so that the projection part of the first substrate and the projection part of the third substrate may project in the same direction.

4. The display device according to claim 2, wherein the display panel and the liquid crystal panel are provided so that the projection part of the first substrate and the projection part of the third substrate may project in opposite directions to each other.

5. The display device according to claim 4, further comprising:

a housing that houses the display panel and the liquid crystal panel; and a spacer provided between the surface of the projection part of the third substrate at the fourth substrate side and the housing.

* * * * *